(12) United States Patent
Woodard et al.

(10) Patent No.: US 6,455,141 B1
(45) Date of Patent: Sep. 24, 2002

(54) LAMINATE STRUCTURE AND PROCESS FOR ITS PRODUCTION

(75) Inventors: F. Eugene Woodard, Los Altos; Louis C. Lau, Sunnyvale, both of CA (US)

(73) Assignee: Southwall Technologies Inc., Palo Alto, CA (US)

( * ) Notice: Subject to any disclaimer, the term of this patent is extended or adjusted under 35 U.S.C. 154(b) by 389 days.

(21) Appl. No.: 09/029,039

(22) PCT Filed: Jul. 24, 1996

(86) PCT No.: PCT/US96/12393

§ 371 (c)(1),
(2), (4) Date: Feb. 20, 1998

(87) PCT Pub. No.: WO97/03763

PCT Pub. Date: Feb. 6, 1997

Related U.S. Application Data

(60) Provisional application No. 60/001,406, filed on Jul. 24, 1995.

(51) Int. Cl.[7] .............................. B32B 7/10; B32B 17/10
(52) U.S. Cl. ....................... 428/214; 428/215; 428/334; 428/339; 428/436; 428/437
(58) Field of Search ................................. 428/334, 347, 428/349, 412, 436, 437, 469, 483, 524, 689, 699, 701, 702, 335, 336, 339, 213, 215, 214

(56) References Cited

U.S. PATENT DOCUMENTS 4,465,736 A * 8/1984 Nishihara et al. ............ 428/332

* cited by examiner

Primary Examiner—D. S. Nakarani
(74) Attorney, Agent, or Firm—Burns, Doane, Swecker & Mathis, LLP

(57) ABSTRACT

The defect known as "applesauce" is eliminated from laminated glass structures which include an intermediate plastic film carrying an energy reflective layer by adhering this film to one of the glass sheets of the laminate with an adhesive layer which is less than 5 mils (0.127 mm) thick.

19 Claims, 2 Drawing Sheets

LAMINATE STRUCTURE AND PROCESS FOR ITS PRODUCTION

This application claims benefit of Provisional application No. 60/001,406 filed Jul. 24, 1995.

FIELD OF THE INVENTION

This invention relates to laminated glass structures and methods for their production. More particularly it concerns high performance energy reflective laminated glass structures with improved visual appearance and improved life.

BACKGROUND OF THE INVENTION

Laminated glass has been in widespread use for over fifty years. Conventional laminated glass has two or more sheets of glass fixed to one another with an intermediate layer of bondable adhesive plastic, particularly poly(vinylbutyral) ("PVB"). This is the conventional "safety glass" structure.

In some cases it is desired to incorporate an energy reflective layer into glass laminates to give a high performance product. This reflective layer can be added for light control and/or more typically for heat control with the layer serving as a heat reflector.

The energy reflective layer can be one or more thin substantially transparent layers of metal or metal oxide or combinations of metal and metal oxide or the like. Various configurations for energy reflective layers are well known in the art.

There are two methods commonly in use to produce energy-reflective high performance laminated glass. The most widely-used method is to deposit the energy-reflective layer directly on one of the glass sheets, commonly by a vacuum deposit method such as sputter deposition or by vacuum evaporation; and then add a sheet of PVB over the reflective layer followed by a top lite of glass.

This three layer sandwich is then run through a conventional heat and pressure lamination process to form a single bonded unit.

The other practice is to put the vapor-deposited coating on a flexible substrate such as PET, encapsulate this coated film between two relatively thick sheets of PVB, sandwich the PVB-film-PVB stack between two panes of glass, and then run the standard heat and pressure lamination process. Compared to putting the reflective coating directly on glass, putting coating on a flexible substrate makes it easier to manufacture in a continuous fashion. It also makes it easier to inventory reflective-coated materials before lamination and permits one to ship coated films to distant laminators. The choice of 15 mil (0.38 mm) or thicker sheets of PVB has offered two advantages. First, the PVB can be sold in pre-formed sheets. Second, the sheets of PVB provide structural properties such as fracture resistance when thick.

The use of coated film encapsulated between two sheets of 15 mil (0.38 mm) or thicker PVB for making laminated glass has been practiced commercially for many years. Coated PET and PVB are pre-laminated or are laminated during the final glass unit lamination process. The problem with this approach is that commercial sheet PVB is textured for de-airing during lamination. The texture from the PVB will emboss onto the PET. Subsequently, the reflective image from the vapor deposited coating is not planar and is objectionable. This waviness in the reflective image is referred to in the trade as "applesauce". Three means on paper to minimize this effect involve 1) using PVB sheets with relatively smooth surface (U.S. Pat. No. 5,091,258 by Monsanto), 2) masking the visible effects of wrinkles in the coated film by minimizing the reflectivity of the coating (U.S. Pat. No. 4,973,511 by Monsanto), and 3) using PET with certain thermal shrink characteristic (U.S. Pat. No. 4,465,736 by Teijin). However, these prior methods have not proved to be satisfactory because "applesauce" is not completely eliminated. The shortcomings of these methods become very obvious when a reflective coated plastic film is used.

The use of a reflector-coated plastic film in laminated glass units has a second problem. Reflective coatings on PET are more susceptible to corrosion than similar coatings on rigid substrates. Presumably, this is due to cracking or fracturing of the coating during lamination, creating tunnels for corrosive elements to transfer through or past the thick PVB layers. To prevent such corrosion, a special reflective coating which includes gold has been employed. This adds cost. The invention described herein eliminates "applesauce" completely and for reasons not completely understood, substantially reduces the tendency for coatings to corrode.

STATEMENT OF THE INVENTION

We have now found a way to eliminate the optical distortion known as "applesauce" from laminated glass structures which include an energy-reflective coated plastic intermediate layer.

Stated most generally we have found that if we bond the coated plastic intermediate layer to one of the glass sheets using a very thin (e.g. 0.25 to 5 mil) (0.006 mm to 0.127 mm) layer of adhesive this gives a highly planar texture to the coated plastic intermediate layer. This planarity is retained when this glass-sheet-adhesive-plastic film composite is incorporated into a final laminated glass structure using a second layer of adhesive and a second sheet of glass.

In one aspect this invention provides an "applesauce"-free laminated glass final product. This product has a first glass sheet with a smooth first surface; a first adhesive layer affixing a plastic film to the smooth surface of the first glass sheet. This first adhesive layer is thin, that is less than 5 mils (0.127 mm) thick. The plastic film is registered and conformed to the smooth surface of the first glass sheet. The plastic film carries an energy-reflective coating. The glass laminate is completed by a second adhesive layer bonding the plastic film to a second glass sheet. The energy-reflective layer can be on either side of the plastic film but better results are achieved if it faces the thin adhesive layer and first glass sheet.

In another aspect this invention provides an intermediate to this final product. This intermediate is a plastic film carrying the energy reflective layer and a 5 mil (0.127 mm) or less coating of adhesive on either side of the film but preferably on the side carrying the energy reflective layer where it unexpectedly provides a final product having greater stability and product life with improved corrosion resistance for the energy reflective layer.

In a further aspect the invention provides a method for producing this intermediate in which an energy reflective layer coated plastic film is coated (preferably over the energy reflective coating) with a solution of an adhesive. Then the solvent is removed from the solution coating, leaving a layer of adhesive on the energy-reflective layer carrying plastic film. The thickness of the coating of adhesive solution is predetermined to yield a final neat adhesive layer that is less than 5 mils (0.127 mm) thick.

This process can be part of an overall laminated window production scheme in which the adhesive-coated, reflective layer-carrying plastic film is adhered and conformed to a smooth surface of a first sheet of glass, a second layer of adhesive is applied followed by a second sheet of glass and the overall structure is laminated.

BRIEF DESCRIPTION OF THE DRAWINGS

This invention will be further set forth with reference being made to the accompanying drawings. Whenever possible, the same number is used for the same element in these drawings.

DETAILED DESCRIPTION OF THE INVENTION

Figure 1:
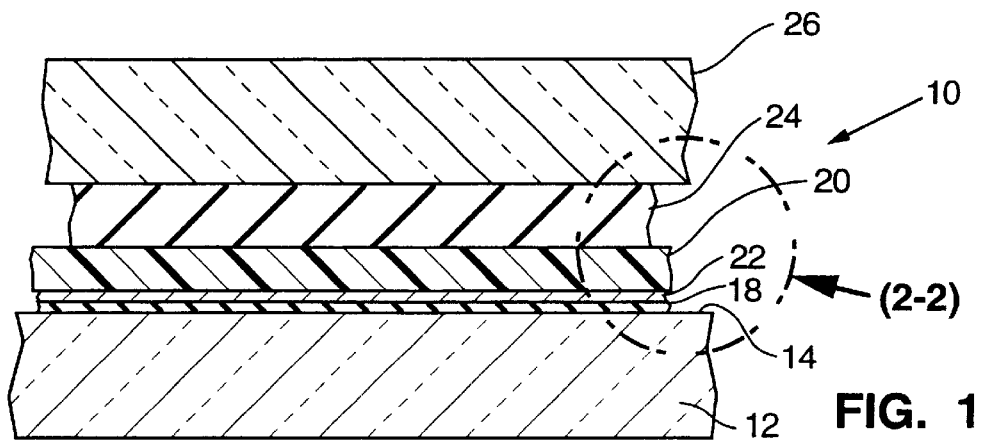
FIG. 1 is a schematic sectional view of a laminated glass product in accordance with one embodiment of the invention.
Figure 2:
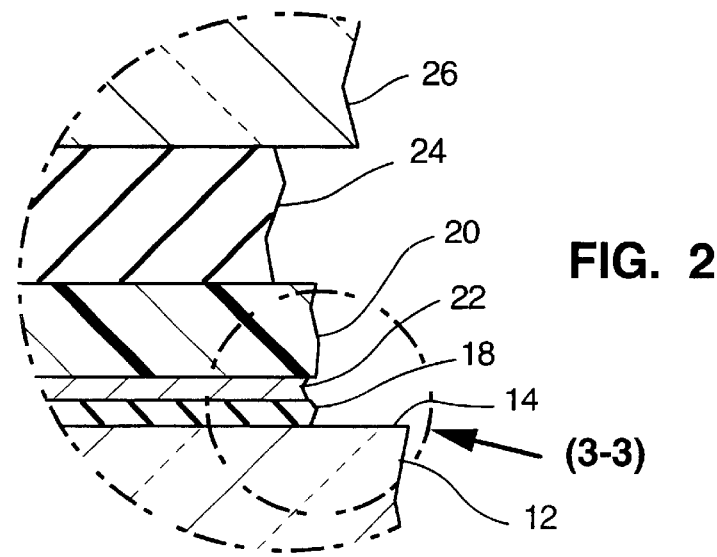
FIG. 2 is an enlarged sectional view of the glass product of FIG. 1 illustrating more clearly the relationship of the thick and thin adhesive layers to the glass sheets and the reflective-layer-carrying plastic film.

As illustrated in FIGS. 1 and 2, the laminated glass structures 10 of this invention include a first sheet of glass 12, having a smooth first surface 14 to which is adhered, a first adhesive layer 18 which is 5 mils (0.127 mm) or less in thickness. Plastic film 20 is also adhered to layer 18, either directly or through energy reflective layer 22 (as shown). A second adhesive layer 24 bonds plastic layer 20 to second sheet of glass 26.

Figure 5:
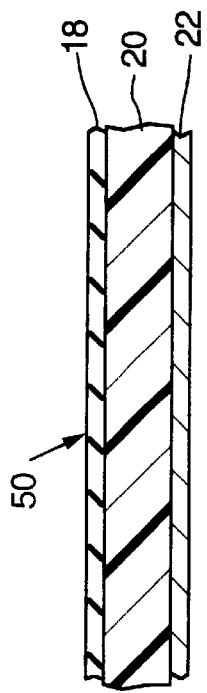
FIG. 5 is a schematic sectional view of another embodiment of the intermediate.
Figure 4:
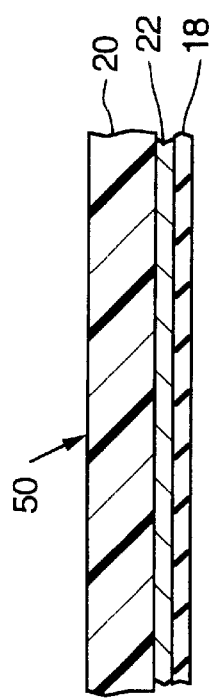
FIG. 4 is a schematic sectional view of one embodiment of the adhesive-reflector-film intermediate of this invention.

As illustrated in FIGS. 4 and 5, the intermediate plastic film 50 includes adhesive layer 18, film 20 with energy reflective layer 22. While it is preferred to place the adhesive layer 18 on top of the energy-reflective layer 20, as illustrated in FIG. 4, one can also practice this invention by applying the thin adhesive layer 18 to the back side (non-energy reflective side) of the film 20 as is illustrated in FIG. 5.

Layer Thicknesses

Layer thickness, especially the thickness of the adhesive layers, plays an important role in this invention.

The first adhesive layer, that is the layer which bonds the plastic film to the first glass sheet should be less than 5 mils (0.127 mm) in thickness. It can be as thin as 0.25 mils (0.006 mm) or even thinner. Preferred thicknesses, based on performance and ease of reproducible preparation are from 0.25 mils to 4 mils (0.006 mm to 0.102 mm) and especially 0.50 mils to 3.0 mils (0.013 mm to 0.076 mm) and more especially about 1 mil (0.025 mm).

The second adhesive layer can be chosen from a wide range. It could, if desired, be as thin as the first layer but more commonly is thicker such as up to 300 mils (7.62 mm) for structured purposes and also to act as a leveling agent between the two sheets of glass which may not be identical in contour. Thus the layer can be from 0.25 to 300 mils (0.006 mm to 7.62 mm) but is more commonly from 5 to 250 mils (0.127 mm to 6.35 mm) and especially 10 to 200 mils (0.254 mm to 5.08 mm).

The plastic film can range in thickness from about 0.5 mils to about 15 mils (0.013 mm to 0.38 mm). This thickness is not critical. Most commonly plastic films in the 0.5 to 10 mil (0.013 mm to 0.754 mm) range and especially 1 to 8 mil (0.025 mm to 0.2 mm) range are employed.

The reflective coatings are very thin with thicknesses in the angstrom and millimicron range being the norm.

The Adhesives

The adhesive used in the thin adhesive layer 18 of the present products is selected based on its processing properties. In particular it should be capable of forming smooth coherent films of the desired, less than 5 mil (0.127 mm), thickness. It should also be soluble in volatile solvents to permit its application in accord with the preparative method taught herein.

In addition it is generally preferred that the adhesive be heat activated or heat curable, that is to be thermoplastic. This property comes into play in conventional laminated glass processes where heat and pressure are used to laminate the various layers into a final laminated glass product.

Poly(vinylbutyral) (with or with plasticizer), polyurethanes and ethylene vinyl acetate polymers meet these criteria. Polyvinylbutyral is the preferred material for forming the thin adhesive layer.

The thick adhesive layer 24 can be a preformed layer of poly(vinylbutyral), polyurethane, ethylene vinyl acetate polymers or the like. These materials are available in preformed sheets, generally with textured surfaces to allow for de-airing during lamination. Commercial materials have given good results.

Monsato's Butvar™ brand PVB resin is a preferred adhesive for the thin layer and may include UV stabilizers or absorbers such as Ciba Geigy's Tinuvin 770 and 328 which can be added to the adhesive.

Monsanto's preformed Saflex TG sheet is a preferred material for the thick adhesive layer.

The Plastic Film

The plastic film employed in this invention can be made of any flexible plastic (polymer) material which is capable of being coated with the energy reflective layer.

Polyesters and polycarbonates are two classes of materials which find widespread application as substrates for energy reflective layers. Other equivalent materials can be used.

Polyesters are generally preferred with poly (terephthalates) and particularly poly (ethyleneterephthalates) being the most preferred plastic film.

The plastic film may be treated on its backside by preglowing it or by subjecting it to a dielectric coating or by subjecting it to a silane treatment if desired to enhance its adhesion to the adhesive.

The Energy Reflective Layer

Figure 3A:
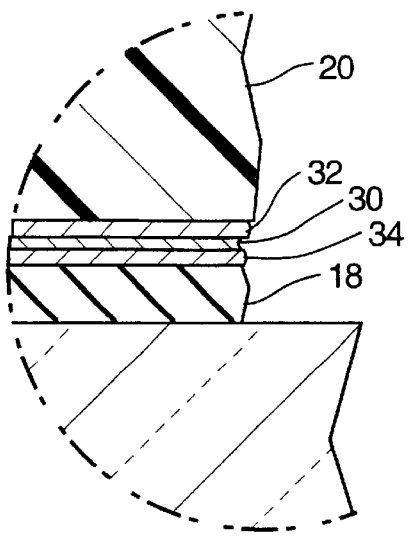
FIG. 3A and FIG. 3B are further enlarged views of the section of glass product shown in FIG. 2 showing preferred energy reflective layer configurations.
Figure 3B:
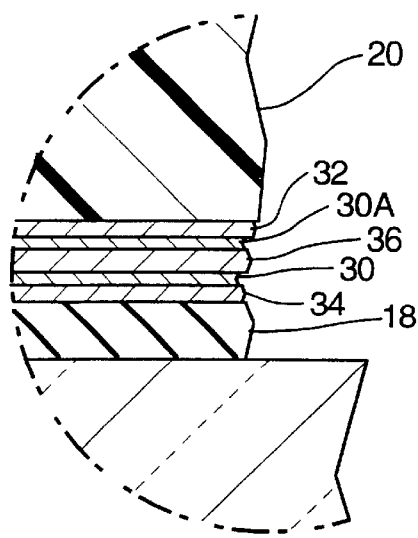

The plastic film carries an energy reflective layer. This can be a simple semi-transparent metal layer or a series of dielectric layers. More preferred energy reflective layers are shown in FIGS. 3A and 3B made up of one or more semi transparent metal layers 30, 30A bounded on each side by transparent dielectric layers 32, 34 and 36.

Examples of these metal dielectric constructs have been manufactured by Southwall Technologies Inc. in laminated and non-laminated structures with silver and silver/gold as the metal and indium oxide and indium tin oxide as the dielectric.

These layers can be adjusted to reflect particular wave lengths of energy in particular heat and other long infrared wavelengths. See U.S. Pat. Nos. 4,799,745 and 4,973,511 (which are incorporated herein by reference) for descriptions of preferred metal-dielectric stack energy reflectors.

Production Process

The process used to produce these products involves applying the thin layer of adhesive to the heat-reflective plastic film, laminating this adhesive coated plastic film to a first sheet of glass adding the thick adhesive layer and thereafter the second sheet of glass.

Figure 6:
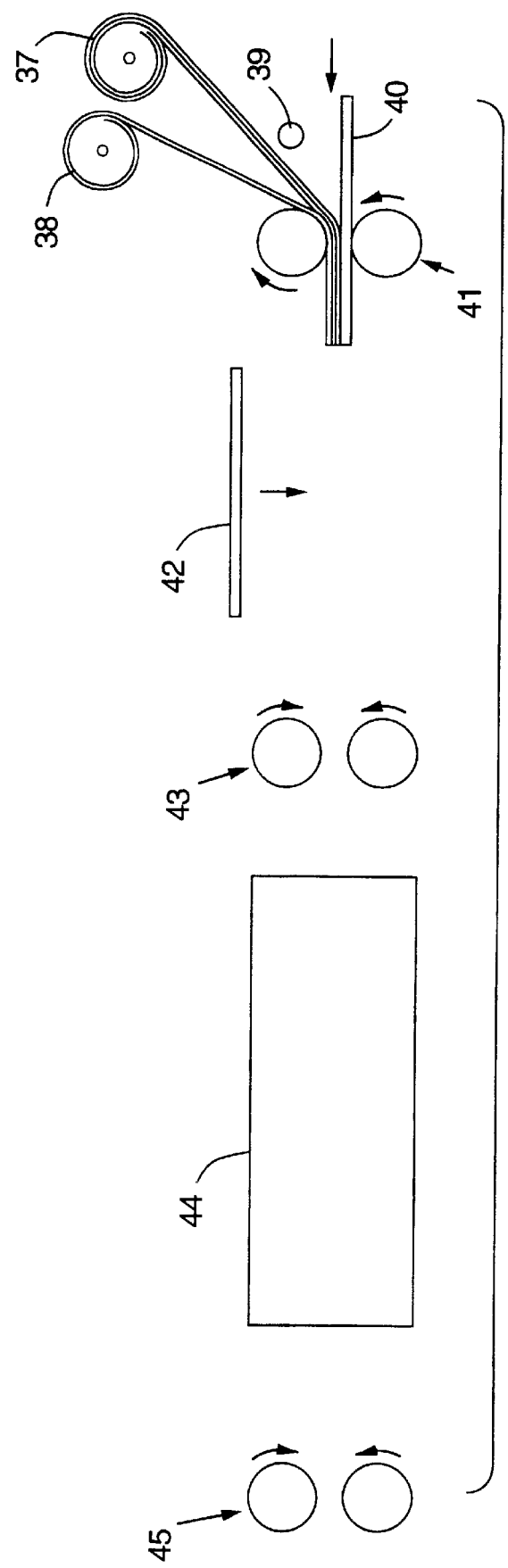
FIG. 6 is a diagram illustrating the process steps involved in one process for preparing the laminated glass structure.

This process is shown schematically in FIG. 6. A preformed sheet of plastic film 37 carrying a thin layer of adhesive and an energy reflective layer, and a thick layer of adhesive 38 are contacted with glass sheet 40 optionally after heating by heater 39. Rollers 41 deair the thick adhesive layer 38, sheet of plastic film 37, and glass sheet 40 and cause the plastic film to be oriented and registered flat by glass sheet 40.

Second glass sheet 42 is then added and the resulting stack is passed through a second set of nip rollers 43 to deair the interface between the second glass sheet and the thick adhesive layer.

The de-aired stack is passed through furnace 44 to heat the laminate in order to tack the various layers to one another. Next, the product passes through a third set of nip rollers 45 to seal the edges of the laminate. Commonly, the product is given further heat treatment to assure a complete boundary of the various layers via the thermoplastic adhesive layers.

The sheets of plastic film (37 in FIG. 6, 20 in FIG. 4 or 5) carry an energy-reflective layer (22 in FIG. 4 or 5) and a thin adhesive layer (18 in FIG. 4 or 5). The energy-reflective layer is applied using sputter depositing or a similar thin-film-forming process for metals and metal compounds. These processes are well known and described in the literature (See U.S. Pat. No. 4,799,745, for example).

The layer of adhesive 18 needs to be applied with care. It needs to be a smooth consistent layer and very thin (particularly less than 5 mils (0.127 mm) in thickness). We have found that the easiest way to do this is to coat the surface of the sheet with a solution of the adhesive in a volatile solvent and then remove the solvent.

The solvent system used can be any material which dissolves or finely suspends the adhesive. In general the common organic solvents such as lower alcohols, ketones, esters and the like can be used. One can consult the specification sheets for the particular adhesives employed to determine particular solvent systems to employ.

The adhesive solution should be applied in an amount which, after solvent removal, will provide the desired less than 5 mil (0.127 mm) thickness for the thin adhesive layer. This can be done empirically. For example, if a solution comprising 20% solution and 80% volatile solvent is applied one can estimate that the final film thickness will be about one fifth the depth of the solution applied.

The depth and smoothness of the adhesive solution can be controlled either by applying (such as by spraying or rolling) a solution which is dilute enough to flow out to a smooth sheet and using an amount selected to give the desired depth. Alternatively one can apply an excess of adhesive solution and level it to a desired depth with a doktor blade or the like. We have had satisfactory results using the simpler "spray and flow" method.

Solvent removal can be accomplished with or without heating or air movement. In most industrial settings it is desired to capture the volatile solvents as they evaporate so often a heated forced air source is employed together with a solvent recovery system on the exhaust.

Product Properties

The practice of this invention provides glass laminates which are free of "applesauce". In addition, as will be illustrated in the Examples, these materials have superior corrosion resistance and a prolonged service life.

This invention will be further described by the following Example:

A. Casting a Thin Thermoplastic Layer on Metallized PET

A solution of Monsanto's Butvar™ B-98 (23% by weight), Ciba Geigy's Tinuvin 770 (1% solid), and Tinuvin 328 (1% solid) dissolved in 60/40 ratio toluene and ethyl alcohol (75% by weight) was cast directly on Southwall Technologies' 2 mil (0.05 mm) HM XIR-70® film. This HM XIR-70® coating used is described in U.S. Pat. No. 4,973,511 and is a series of dielectric-metal-dielectric-metal-dielectric layers on PET sheet. The solution was cast at a line speed of 30 ft/min with a drying temperature of 212° F. (100° C.). The final product was a XIR-70® film with a 1 mil (0.025 mm) (25 g/cm) clear, smooth (+0.05 mil) Butvar™ B-98 coating on top of the reflective layer.

B. Glass Lamination with Metallized Film Coated with a Thin Thermoplastic Layer

The glass lamination with the metallized film coated with a thin thermoplastic layer of Example A involved three de-airing stages. The first de-airing step involved the pre-nipping of a 15 mil (0.38 mm) sheet of the PVB, the 2 mil (0.05 mm) XIR-70® coated with 1 mil (0.025 mm) of Butvar™ B-98 of Example A, and ⅛" (3.175 mm) thick glass. The line speed was 10 ft/min (305 cm/min); the nip temperature was ambient temperature; and the nip pressure was 20 psi (1.41 kg/cm$^2$). After the first nip, the top ⅛" (3.175 mm) thick glass was placed on top of the 15 mil (0.38 mm) sheet of PVB. After trimming the edges, the laminate was nipped the second time at 10 ft/min (305 cm/min), 80 psi (5.85 kg/cm$^2$), and ambient temperature. After the second nip, the laminate went through a furnace and was nipped the third time at 10 ft/min (305 cm/min), 80 psi (5.85 kg/cm$^2$), and 160° F. (71° C.). After the third nip, the laminate went into the autoclave and was processed at 250° F. (121° C.), 165 psi (12.06 kg/cm$^2$), with a 20 minute hold time to form the completed glass product.

C. Product Performance and Test Results

The results described below are based on the material of Example B unless stated otherwise:

1) Using the process of A and B we were able to make 60"×70" (152 cm×178 cm) laminated glass samples with HM XIR-70® film which has a 1% film reflectivity. The samples had no "applesauce " at all.

2) We were able to make 48"×48" (122 cm×122 cm) laminated glass samples with a similar energy-reflective film which has a 7% film reflectivity. The samples had no "applesauce" at all. (This is a harder test as the higher reflectivity makes defects more apparent.)

3) We were able to make 12"×12" (30.5 cm×30.5 cm) laminated glass samples with gold reflective film which has a >50% film reflectivity. The samples had no "applesauce" at all.

4) Laminated glass samples with HM XIR-70® film and Butvar™ passed the 16 CFR1201 Category II impact test.

5) Laminated glass samples with HM XIR-70® and Butvar® had no corrosion after 1,400 hours of salt fog exposure and only 3% of corrosion after 1,700 hours. This test was performed as specified in ASTM B-117.

6) Laminated glass samples with HM XIR-70® and Butvar™ had very high peel adhesion up to a point that PET is torn during 90° peel test. Typical peel adhesion between PVB and HM XIR-70® coating without any adhesion promoting layer was 2.44 lb/in (0.436 kg/cm).

7) Laminated glass samples with HM XIR-70® and Butvar™ passed a boiling water test without degradation.

8) Laminated glass samples with HM XIR-70® and Butvar™ exhibited good adhesion in an adhesion test.

9) Laminated glass samples with HM XIR-70® and Butvar™ had no degradation after 1,000 hours of xenon exposure (ASTM G-26) and 2,500 hours QUV-A exposure.

What is claimed is:

1. In a laminated glass comprising in contact sequence a first glass sheet presenting a smooth first surface,
   a first adhesive layer
   a plastic film substrate carrying an energy-reflective coating
   a second adhesive layer and
   a second glass sheet, the improvement comprising:
   employing a thin first adhesive layer having a thickness below 5 mils such that the plastic film conforms to and is registered by the smooth first surface of the first glass sheet and employing a thick second adhesive layer having a thickness greater than that of the first adhesive layer.

2. The laminated glass of claim 1 wherein the first adhesive layer has a thickness from 0.25 to 4.0 mils and the second adhesive layer has a thickness of from 5 to 250 mils.

3. The laminated glass of claim 2 wherein the first adhesive layer contacts a surface of the plastic film substrate not carrying the energy-reflective coating.

4. The laminated glass product of claim 3 wherein each of the first and second adhesive layers is thermoplastic adhesive.

5. The laminated glass product of claim 4 wherein each of the first and second adhesive layers comprises poly(vinylbutyral).

6. The laminated glass product of claim 2 wherein the first adhesive layer contacts the energy reflective coating.

7. The laminated glass product of claim 6 wherein each of the first and second adhesive layers is thermoplastic adhesive.

8. The laminated glass product of claim 7 wherein each of the first and second adhesive layers comprises poly(vinylbutyral).

9. The laminated glass product of claim 2 wherein the first adhesive layer is a thermoplastic adhesive.

10. The laminated glass product of claim 9 wherein the first adhesive layer comprises poly(vinylbutyral).

11. The laminated glass product of claim 10 wherein the second adhesive layer comprises poly(vinylbutyral).

12. The laminated glass product of claim 9 wherein the second adhesive layer is a thermoplastic adhesive.

13. The laminated glass of claim 1 wherein the first adhesive layer has a thickness from 0.5 to 3.0 mils and the second adhesive layer has a thickness of from 10 to 200 mils.

14. The laminated glass product of claim 1 wherein each of the first and second adhesive layers is thermoplastic adhesive.

15. The laminated glass product of claim 14 wherein each of the first and second adhesive layers comprises poly(vinylbutyral).

16. The laminated glass product of claim 1 wherein the energy-reflective coating is a sputter-deposited dielectric-metal-dielectric energy-reflective coating.

17. The laminated glass of claim 16 wherein the first adhesive layer has a thickness from 0.25 to 4.0 mils and the second adhesive layer has a thickness of from 5 to 250 mils.

18. The laminated glass of claim 16 wherein the first adhesive layer has a thickness from 0.5 to 3.0 mils and the second adhesive layer has a thickness of from 10 to 200 mils.

19. The laminated glass of claim 18 wherein each of the first and second adhesive layers comprises poly(vinylbutyral).

* * * * *